United States Patent [19]

Vinarcsik et al.

[11] 4,034,837

[45] July 12, 1977

[54] CONVEYOR ROLLER STRUCTURE

[75] Inventors: Joseph E. Vinarcsik, Homewood; John A. Jachim, Chicago, both of Ill.

[73] Assignee: Hi-Hard Rolls, Inc., Harvey, Ill.

[21] Appl. No.: 629,796

[22] Filed: Nov. 7, 1975

[51] Int. Cl.² .................................... B65G 39/00
[52] U.S. Cl. ................................ 193/37; 29/110; 29/256; 198/780
[58] Field of Search .................. 193/37, 35 R; 198/127 R, 780; 308/20; 29/110, 115, 116 R, 116 AD, 129, 244, 246, 250, 256, 239, 282

[56] References Cited

U.S. PATENT DOCUMENTS

| | | | |
|---|---|---|---|
| 1,946,024 | 2/1934 | Lamatsch | 29/116 R X |
| 2,459,221 | 1/1949 | Farrington | 29/250 X |
| 3,034,464 | 5/1962 | Hrabal | 29/256 X |
| 3,494,675 | 2/1970 | Hold et al. | 29/116 AD X |
| 3,853,214 | 12/1974 | Vinarcsik et al. | 198/127 R |

FOREIGN PATENT DOCUMENTS

| | | | |
|---|---|---|---|
| 247,235 | 5/1966 | Austria | 198/127 R |
| 860,923 | 12/1952 | Germany | 198/127 R |

*Primary Examiner*—Evon C. Blunk
*Assistant Examiner*—James L. Rowland
*Attorney, Agent, or Firm*—Olson, Trexler, Wolters, Bushnell & Fosse, Ltd.

[57] ABSTRACT

A conveyor roller is disclosed which has flanges radially inwardly thereof at its ends. Stub shafts are secured to the flanges by bolts passing through mating flanges formed on the stub shafts. Threaded apertures are formed in the flanges of the stub shafts to receive bolts to bear against the flanges at the ends of the roller sleeve to function as screw jacks for removing the stub shafts. One end of the conveyor roller includes noncircular rotational restriction means to drive the conveyor roller.

3 Claims, 4 Drawing Figures

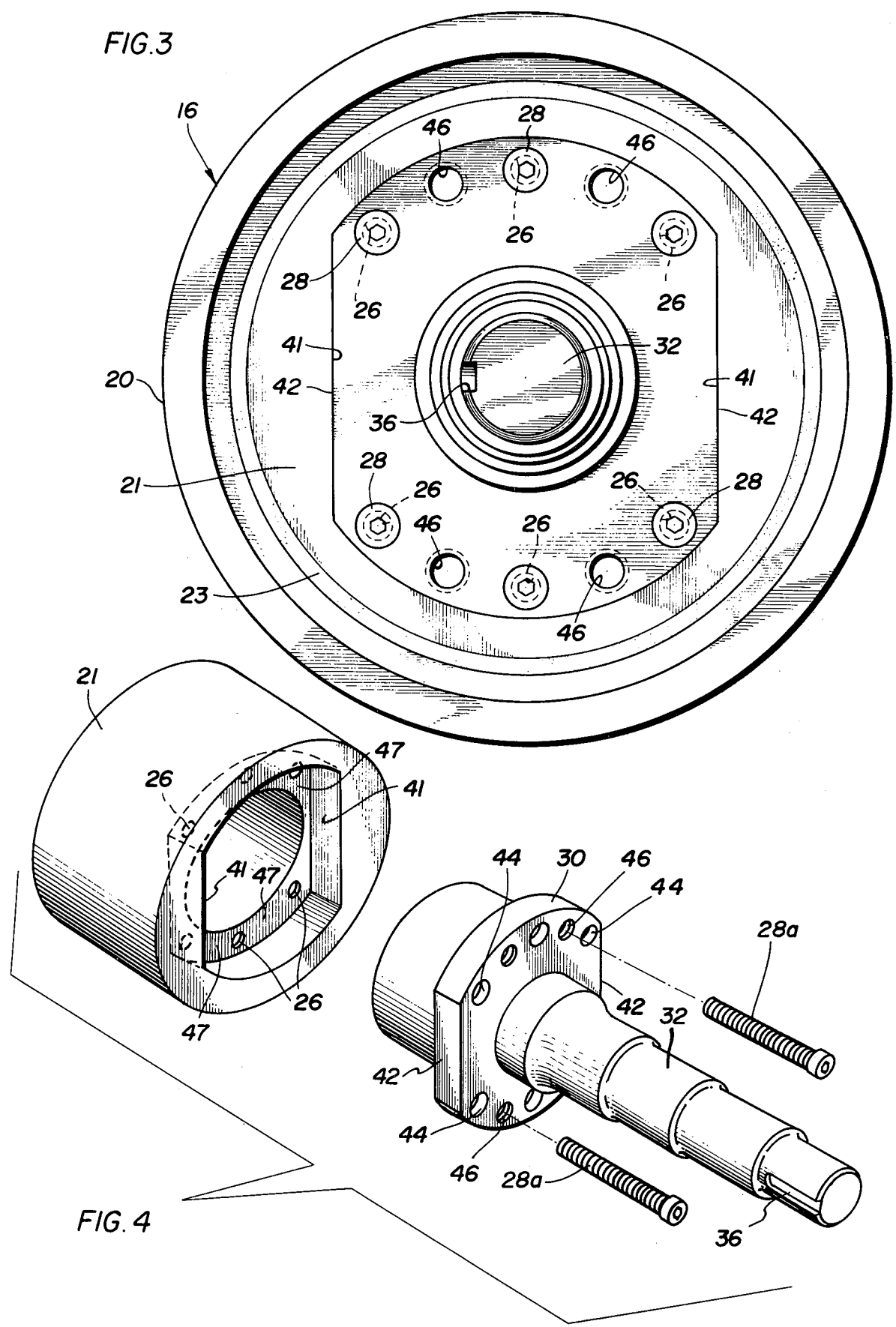

CONVEYOR ROLLER STRUCTURE

BACKGROUND OF THE INVENTION

This invention relates generally to conveyor roller structures, and more particlularly to a conveyor roller structure which can be used to accelerate and decelerate heavy loads. Specifically, the invention is directed to a conveyor roller structure which has means for providing easy removal and replacement of the roller sleeves.

During operation of a conveyor structure, heavy loads may be accelerated and decelerated upon the conveyor rollers. Because of this acceleration and deceleration of the heavy loads on the rollers, the outer sleeves of the rollers, which are the primary wear surfaces may come loose thereby requiring premature replacement. Preferably, the outer sleeve is made to be replaced when excessively worn. However, premature replacement caused by the sleeve coming loose is time consuming and costly.

One such prior art conveyor roller structure utilizes outer sleeves which are pinned or staked to a central rotatable shaft. However, many times the pins cause elongation of the aperture through which they pass thereby causing loosening of the connection between the outer sleeve and the flange on the shaft upon which the sleeve is secured. When this happens, premature replacement is required of the roller sleeve before a serious breakdown occurs.

To overcome this problem, I have provided noncircular rotational-restricting surfaces welded at the ends of the sleeves to receive correspondingly shaped ends on the drive shaft. This is clearly set forth in my previous patent 3,853,214. In this patent, the shaft is held to the flange by a collar which is welded in place about the periphery. To replace the roller sleeve, the collar must be removed with the use of a cutting torch. The new sleeve is then replaced and a new collar welded in position to secure the sleeve to the shaft, the use of a cutting torch and welding equipment is expensive and time consuming.

SUMMARY OF THE INVENTION

Accordingly, it is an object of the present invention to provide an improvement over my previous conveyor roller structure disclosed in U.S. Pat. No. 3,853,214.

It is another object of this invention to provide a conveyor roller structure which is quickly and easily disassembled for replacement of the roller sleeves and reassembled without the use of cutting torches or welding equipment.

Briefly, the conveyor roller structure of this invention includes a roller sleeve having a first flange within the sleeve and extending radially inwardly thereof. A first plurality of threaded apertures are formed in the flange preferably about a common radius. A stub shaft has a second flange extending radially outwardly thereof and is of a diameter to be inserted into the ends of the sleeve to mate with the first flange within the sleeve. There are threaded apertures in the first flange in the sleeve and unthreaded apertures in the second flange on the stub shaft. Bolts extendd through the flanges to secure the stub shaft to the roller sleeve. A second plurality of threaded apertures are formed in the second flange on the stub shaft. Upon removing the bolts securing the stub shaft to the sleeve a different set of bolts is inserted into the second plurality of threaded apertures. The second bolts function as screw jacks to remove the tightly fitted stub shaft from the sleeve for replacement. It will be understood that the same set of bolts can be used for both the securing and removing of the stub shafts.

Many other objects, features and advantages of this invention will be more fully realized and understood from the following detailed description when taken in conjunction with the accompanying drawings wherein like reference numerals throughout the various views of the drawings are intended to designate similar elements and components.

BRIEF DESCRIPTION OF THE DRAWINGS

FIG. 3 is an end view of the structure of FIG. 2; and

FIG. 4 is a perspective view showing the welded-in flange of the sleeve and the stub shaft with its associated flange.

DETAILED DESCRIPTION OF THE ILLUSTRATED EMBODIMENT

Figure 1:
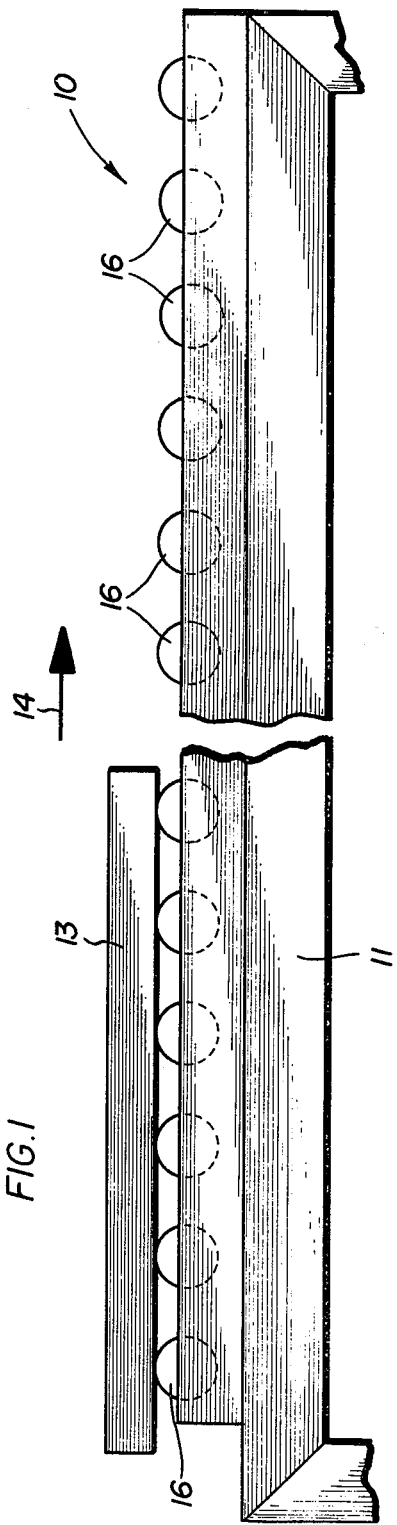
FIG. 1 is a somewhat diagrammatic elevational view of a conveyor structure wherein the roller construction of this invention is used.

Referring now to FIG. 1, there is seen a conveyor structure designated generally by reference numeral 10. The conveyor structure 10 includes a lower table portion 11 rotatably supporting a plurality of table rollers 16. The conveyor can be used for any suitable means, but here it is illustrated for the purpose of transporting heavy loads such as iron or steel members as indicated by reference numeral 13. The direction of travel of material on the conveyor is indicated by the arrow 14 and in which direction excessive forces may be encountered due to the acceleration of the heavy loads.

Figure 2:
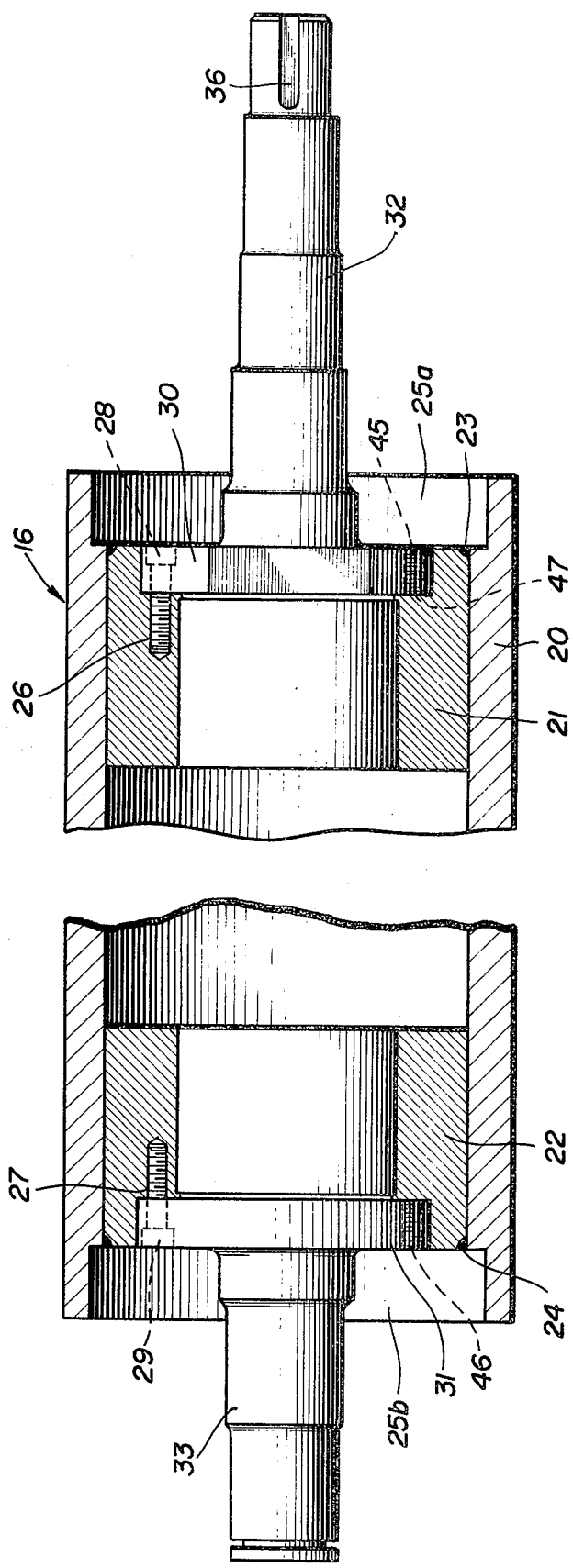
FIG. 2 is a detailed elevational sectional view of a table roller constructed in accordance with the principles of this invention.

FIGS. 2, 3 and 4 illustrate the details of construction of one of the conveyor rollers 16 of FIG. 1 in accordance with this invention. Here a conveyor sleeve 20 has end flanges 21 and 22 secured therein by welding, or other suitable means, about the edges thereof as indicated by reference numerals 23 and 24, respectively. The flanges 21 and 22 are directed radially inwardly of the sleeve and are positioned somewhat inward of the ends of the sleeve to form recesses 25a and 25b. The flanges 21 and 22 have threaded apertures 26 and 27, respectively to receive bolts 28 and 29 for securing stub shafts to the sleeve 20. The bolts 28 and 29 preferably are cap screws with socket heads. The bolts 28 and 29 pass through radially outwardly directed flanges 30 and 31 associated with their respective stub shafts 32 and 33. The stub shaft 33 is arranged for rotation within a bearing while the stub shaft 32 is arranged to be driven by drive means, not shown, and keyed thereto by a key slot 36.

In accordance with this invention, each of the stub shafts are easily removed from the ends of the roller sleeve 20 by removing the cap screws 28 and 29 from threaded apertures 26 and 27 and inserting a new set of larger bolts 28a and 29a into a second set of threaded apertures 45 and 46 in the flanges 30 and 31, respectively. The second set of bolts then act as screw jacks urging against the land portions 47 of the flanges 21 and 22. However, it will be understood that the same bolts 28 and 29 may be used to both secure the stub shaft and to remove the stub shaft from the sleeve.

To insure proper driving engagement of the stub shaft 32 with the roller sleeve 20, the shaft is provided with a flat sided flange, or in other words a flange of noncircular configuration 40 which is inserted into a correspondingly shaped noncircular recess 41 of the flange 21, as best seen in FIG. 4.

As seen in the FIGS. of 3 and 4, the flange 21 has six threaded apertures 26, and the flange 30 has six unthreaded apertures 44 to be arranged in registry therewith. The flange 30, however, has four threaded apertures 46 preferably along the same radius as the unthreaded apertures 44. The threaded apertures 46 are then utilized to receive the cap screws 28 or 29 depending on the flange, and urge against the flat wall 47 within the recess 41 to push the stub shaft 32 or 33 out of its socket. This enables the roller sleeve to be easily replaced when worn. Also, the noncircular rotational restricting configuration of the socket 41 and flange 30 insure positive drive transfer between the drive motor connected to the stub shaft 32 and the roller sleeve which must move the heavy load.

While a single specific embodiment of the present invention has been illustrated herein, it will be understood that variations and modifications may be affected without departing from the spirit and scope as set forth in the following claims.

The invention is claimed as follows:

1. A conveyor roller structure comprising; a roller sleeve, a first flange within said sleeve and extending radially inwardly thereof, and having a noncircular rotational restricting surface extending radially inwardly of the flange, a first plurality of threaded apertures in said first flange, stub shaft means for connection to said first flange, a second flange on said stub shaft means directed radially outwardly thereof and having a noncircular rotational restricting surface in nested, mating, torque-transferring contact with said first flange rotational restricting surface, a second plurality of apertures on said second flange and arranged for registry with said first plurality of threaded apertures for receiving threaded fasteners therein to secure said stub shaft to said roller sleeve, and a third plurality of threaded apertures formed in said second flange on a common radius with the first and second plurality of threaded apertures but located alternatively therebetween and diametrically opposed to one another to receive bolts therein, said bolts functioning as screw jacks for removing said stub shaft from roller sleeve.

2. A conveyor roller structure as set forth in claim 1 wherein the threaded fasteners extending through said first and second apertures for mounting said stub shaft to said roller sleeve are different than the threaded fasteners used to thread within said third plurality of threaded apertures to function as a screw jack for removing said stub shaft from said roller sleeve.

3. A conveyor roller structure as set forth in claim 1 wherein said first flange is inserted into said roller sleeve and welded in place about the inner peripheral margin thereof.

* * * * *